(12) United States Patent
Banatwala et al.

(10) Patent No.: US 11,461,412 B2
(45) Date of Patent: Oct. 4, 2022

(54) KNOWLEDGE MANAGEMENT AND COMMUNICATION DISTRIBUTION WITHIN A NETWORK COMPUTING SYSTEM

(71) Applicant: International Business Machines Corporation, Armonk, NY (US)

(72) Inventors: Mustansir Banatwala, Hudson, NH (US); David A. Brooks, Arlington, MA (US); Miguel A. Estrada, Hollis, NH (US); Joseph A. Russo, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/951,689

(22) Filed: Nov. 25, 2015

(65) Prior Publication Data

US 2017/0149865 A1 May 25, 2017

(51) Int. Cl.
| | |
|---|---|
| *G06F 16/951* | (2019.01) |
| *H04L 51/04* | (2022.01) |
| *G06Q 30/00* | (2012.01) |
| *H04L 51/216* | (2022.01) |

(52) U.S. Cl.
CPC ......... *G06F 16/951* (2019.01); *G06Q 30/016* (2013.01); *H04L 51/04* (2013.01); *H04L 51/216* (2022.05)

(58) Field of Classification Search
CPC ......... H04L 67/10; H04L 51/04; H04L 67/42; H04L 51/16; G06F 17/30864; G06F 16/951; G06Q 30/016
See application file for complete search history.

(56) References Cited

U.S. PATENT DOCUMENTS

| | | | |
|---|---|---|---|
| 6,131,085 A | 10/2000 | Rossides | |
| 6,603,389 B1* | 8/2003 | Murray | H04L 51/30 340/7.2 |
| 7,424,516 B2 | 9/2008 | Leeds | |
| 8,392,360 B1 | 3/2013 | Dicker et al. | |
| 8,463,673 B2 | 6/2013 | Koll et al. | |
| 8,650,497 B2 | 2/2014 | Baldwin et al. | |
| 9,154,514 B1* | 10/2015 | Prakash | H04L 63/1483 |
| 11,227,112 B2* | 1/2022 | Perumalla | G06F 40/279 |
| 2004/0203643 A1* | 10/2004 | Bhogal | H04W 8/18 455/414.1 |
| 2007/0055766 A1* | 3/2007 | Petropoulakis | G06F 11/3006 709/224 |

(Continued)

*Primary Examiner* — Jerry B Dennison
(74) *Attorney, Agent, or Firm* — Cuenot, Forsythe & Kim, LLC

(57) ABSTRACT

Distributing communications to users within a network computing system may include monitoring, using a processor, communications between users exchanged within the network computing system, detecting, using the processor, a question within a first communication from a client device of a first user directed to a client device of a second user, and determining, using the processor, that the question is unanswered. Responsive to detecting an answer to the question in a second communication from a client device of a third user directed to the first user, a further communication notifying the second user of the answer to the question may be sent using a processor.

20 Claims, 5 Drawing Sheets

(56) References Cited

U.S. PATENT DOCUMENTS

| | | | |
|---|---|---|---|
| 2009/0276708 A1* | 11/2009 | Smith | G06Q 10/087 |
| | | | 715/716 |
| 2012/0167007 A1* | 6/2012 | Ross | G06Q 30/02 |
| | | | 715/811 |
| 2012/0173633 A1* | 7/2012 | Balabhadrapatruni | |
| | | | G06Q 10/107 |
| | | | 709/206 |
| 2012/0173992 A1* | 7/2012 | D'Angelo | G06F 3/048 |
| | | | 715/751 |
| 2012/0296988 A1* | 11/2012 | Rao | G06Q 10/107 |
| | | | 709/206 |
| 2013/0007037 A1* | 1/2013 | Azzam | G06F 16/3329 |
| | | | 707/769 |
| 2014/0017646 A1 | 1/2014 | Seitzberg, III et al. | |
| 2015/0242456 A1* | 8/2015 | Cannon | G06Q 10/101 |
| | | | 707/608 |
| 2016/0021038 A1* | 1/2016 | Woo | H04L 51/046 |
| | | | 709/206 |
| 2016/0021039 A1* | 1/2016 | Woo | H04L 51/046 |
| | | | 715/752 |
| 2016/0065673 A1* | 3/2016 | Mehra | H04L 67/1097 |
| | | | 709/203 |
| 2016/0098451 A1* | 4/2016 | Dickie | G06F 16/24544 |
| | | | 707/714 |
| 2016/0228180 A1* | 8/2016 | Sliwa | A61B 5/6885 |
| 2016/0253344 A1* | 9/2016 | Rieschl | G06F 16/164 |
| | | | 707/746 |
| 2016/0366043 A1* | 12/2016 | Bregger | H04L 45/02 |

* cited by examiner

400

| Record | Collaboration | Initiator | Responder | Communication Channel | Content | Notification |
|---|---|---|---|---|---|---|
| 1 | 1 | A | B | Instant Message | Question | - |
| ⋮ | | | | | | |
| 5 | 1 | B | A | Instant Message | No Answer | Yes |
| ⋮ | | | | | | |
| 10 | 1 | A | C | Electronic Mail | Question | - |
| 11 | 1 | C | A | Electronic Mail | No Answer | No |
| ⋮ | | | | | | |
| 15 | 1 | A | D | Social Networking | Question | - |
| 16 | 1 | D | A | Social Networking | Answer | - |

FIG. 4

KNOWLEDGE MANAGEMENT AND COMMUNICATION DISTRIBUTION WITHIN A NETWORK COMPUTING SYSTEM

BACKGROUND

This disclosure relates to knowledge management and communication distribution within a network computing system. Many different types of social interactions take place over network computing systems. Often, users seek advice or answers to questions for specific areas of interest that may be technical in nature and require some minimum level of experience, knowledge, and/or expertise. For example, a first user may ask a question of a second user via a communication channel with the expectation that the second user, having some minimal level of expertise in the domain of the question, has an answer.

In some cases, the second user does not have an answer, thereby causing the first user to seek out other individuals for the needed information. Subsequently, when the first user does eventually obtain an answer, that knowledge may be communicated directly from the person providing the answer to the original user asking the question. Other users that may have an interest in knowing the answer may be excluded from learning the information. The information, however, may be highly relevant to the excluded users. Whether to increase individual knowledge and/or expertise or for purposes of increasing overall organizational knowledge, it is often important that the excluded users obtain the information once determined.

SUMMARY

An embodiment of the present invention may include a method of distributing communications to users within a network computing system. The method may include monitoring, using a processor, communications between users exchanged within the network computing system, detecting, using the processor, a question within a first communication from a client device of a first user directed to a client device of a second user, and determining, using the processor, that the question is unanswered. Responsive to detecting an answer to the question in a second communication from a client device of a third user directed to the first user, a further communication notifying the second user of the answer to the question may be sent using a processor.

Another embodiment of the present invention may include a system for distributing communications to users within a network computing system. The system includes a processor programmed to initiate executable operations. The executable operations may include monitoring communications between users exchanged within the network computing system, detecting a question within a first communication from a client device of a first user directed to a client device of a second user, and determining that the question is unanswered. Responsive to detecting an answer to the question in a second communication from a client device of a third user directed to the first user, a further communication notifying the second user of the answer to the question may be sent.

Another embodiment of the present invention may include a computer program including a computer readable storage medium having program code stored thereon for distributing communications to users within a network computing system. The program code is executable by a processor to perform a method. The method may include monitoring, using a processor, communications between users exchanged within the network computing system, detecting, using the processor, a question within a first communication from a client device of a first user directed to a client device of a second user, and determining, using the processor, that the question is unanswered. Responsive to detecting an answer to the question in a second communication from a client device of a third user directed to the first user, a further communication notifying the second user of the answer to the question may be sent using a processor.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 is an exemplary data structure illustrating a collaboration.

DETAILED DESCRIPTION

This disclosure relates to knowledge management and communication distribution within a network computing system. In accordance with the inventive arrangements described within this disclosure, information deemed to be of interest to one or more users may be made available and/or distributed through the network computing system. Communications exchange between multiple users may be monitored and evaluated to recognize a question posed from one user to another. In cases where the question goes unanswered and further communications to additional users are detected that also pose the same question, users identified as having been asked the question without providing an answer may be added to a notification list associated with the question and/or collaboration including the question. Subsequently, when an answer to the question is ascertained, users on the notification list associated with the question may be notified of the answer. Further details relating to the inventive arrangements are described with reference to the figures below.

Figure 1:
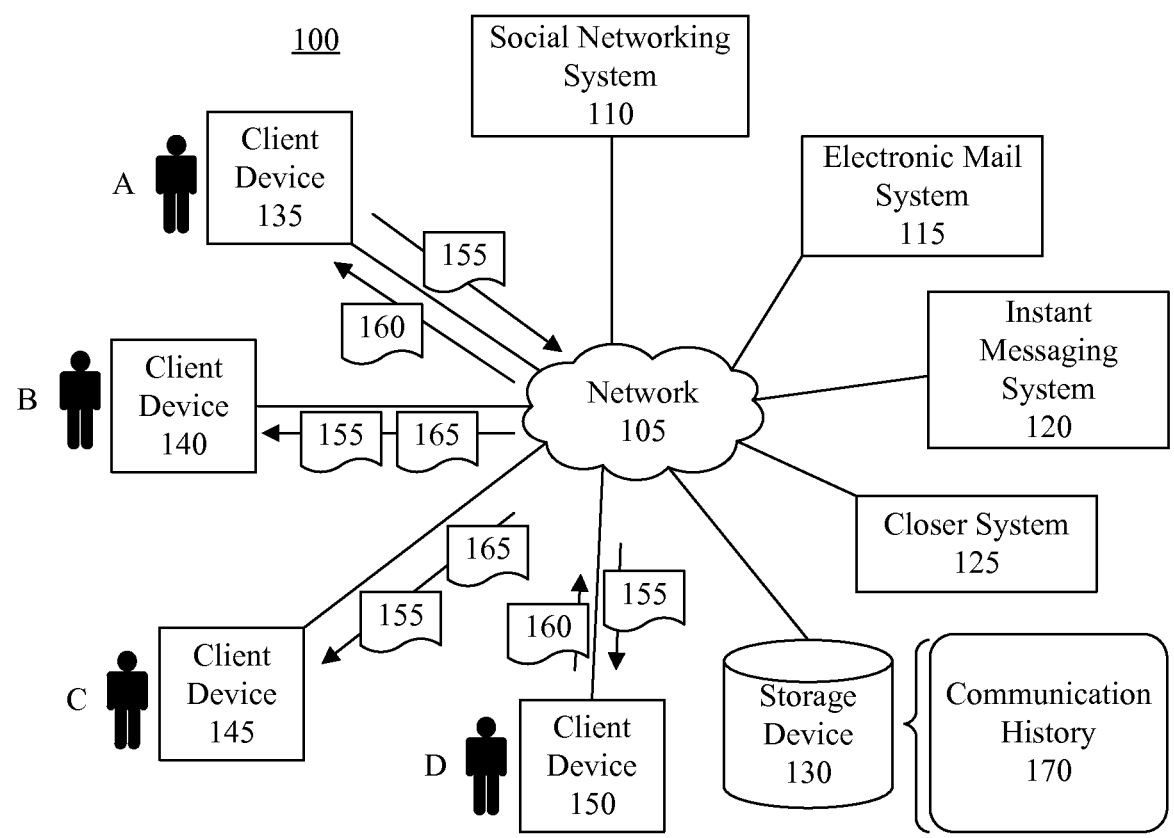
FIG. 1 is a block diagram illustrating an example of a network computing system.

FIG. 1 is a block diagram illustrating an example of a network computing system 100 in which the inventive arrangements may be implemented. Network computing system 100 contains a network 105. Network 105 is the medium used to provide communications links between various devices and data processing systems connected together within network data processing system 100. Network 105 may include connections, such as wire, wireless communication links, or fiber optic cables. Network 105 may be implemented as, or include, any of a variety of different communication technologies such as a Wide Area Network (WAN), a Local Area Network (LAN), a wireless network, a mobile or cellular network, a Virtual Private Network (VPN), the Internet, the Public Switched Telephone Network (PSTN), or the like.

The example of FIG. 1 shows a variety of communication systems including a social networking system 110, an electronic mail system 115, and an instant messaging system 120. In the depicted example, social networking system 110, electronic mail system 115, and instant messaging system 120 each may couple to network 105. A closer system 125 and a storage device 130 may also couple to network 105. In addition, client devices (clients) 135, 140, 145, and 150 may couple to network 105.

Social networking system 110, electronic mail system 115, instant messaging system 120, and closer system 125 each may be implemented as a data processing system such as a server or as one or more interconnected data processing systems or servers. Storage device 130 may be implemented as a network storage device that may be accessed, e.g., read or written, by closer system 125. Clients 135, 140, 145, and 150 may be implemented as personal computers, portable communication devices such as tablet computers, mobile phones, network computers, or the like.

Social networking system 110 is a computing platform that allows users to build social networks or social relations among people who share similar interests, activities, backgrounds, or real-life connections. Through social networking system 110, users may send communications such as by posting messages or other media, commenting on messages, posts, or other media, replying to messages, and performing other operations such as "liking" a communication or item of media, sharing the communication or item of media, expressing an emotional sentiment, or the like. It should be appreciated that in the context of social networking system 110, actions such as posting, replying, liking, sharing, expressing sentiment, and/or the like are programmatic actions that are monitored and persisted within social networking system 110, e.g., within a data storage device in a data structure within and/or accessible by, social networking system 110.

Electronic mail system 115 allows users to exchange communications by sending electronic mails to one another using suitable electronic mail clients. Instant messaging system 120 allows users to exchange communications by sending instant messages to one another using suitable instant messaging clients. Within this disclosure, the term "instant messaging," or derivatives thereof, refers to instant messaging, text messaging, Short Message Service (SMS) communications, or other forms of messaging that provide real time or near real time communication.

Each of social networking system 110, electronic mail system 115, and instant messaging system 120 represents a different communication channel over which users A, B, C, and D, using clients 135, 140, 145, and 150, respectively, may communicate. In one arrangement, closer system 125 may monitor communications exchanged between users A, B, C, and D through one or more communication channels. For example, closer system 125 may use an application programming interface (API) of one or more or all of the communication systems illustrated in FIG. 1 to determine a communication history 170 that may be stored in storage device 130 including communications sent and received among users such as users A, B, C, and D over the various communication channels illustrated.

In one embodiment, user A of client 135 may send a communication 155 to user B, which may be delivered to client device 140. Communication 155 may be an instant message, an electronic mail, or a communication from user A to user B sent through social networking system 110. Closer system 125, as noted, may monitor communications exchanged between users through access to the various communication systems illustrated in FIG. 1.

Closer system 125 may determine that communication 155 includes a question. As such, user A may be considered an "initiator" as the original sender of a communication including a question. In one arrangement, user A may indicate or otherwise mark communication 155 as including a question using a user interface (UI) provided through client 135. Closer system 125 may recognize the indication and determine that communication 155 includes a question. In another arrangement, closer system 125 may perform Natural Language Processing on content of communication 155 and, responsive to the processing, determine that communication 155 includes a question.

Natural Language Processing (NLP) is a field that includes computer science, artificial intelligence, and linguistics. NLP refers to the implementation of computer processes to facilitate interactions between computer systems and human (natural) languages. NLP enables computers to derive computer-understandable meaning from natural language input. The International Organization for Standardization (ISO) publishes standards for NLP. An example of an NLP standard is ISO/TC37/SC4. As part of NLP, semantic analysis may be performed by closer system 125. Semantic analysis may follow parsing and involve extraction of context-independent aspects of a sentence's meaning, including the semantic roles of entities mentioned in the sentence, and quantification information, such as cardinality, iteration, and dependency.

Closer system 125 may utilize NLP to detect questions in communications. In one aspect, punctuation may be used to recognize questions, e.g., the use of a question mark. In another arrangement, closer system 125 may distinguish between questions that are sent from one user to another with the expectation of receiving a response to a question as compared to more rhetorical questions. For example, closer system 125 may include a list of domains, e.g., categories, subjects, keywords, and the like, that may be used to exclude questions. Communications that include questions determined not to relate to an enumerated domain, for example, may be excluded from the notification processing described herein. Exemplary domains may include any of a variety of subjects that an organization may deal with, e.g., different technological subjects, computer programming, computer repair, or the like.

In another arrangement, closer system 125 may store an exclusionary list of questions or text formatives that that may be used to exclude questions from the notification processing described herein. For example, the exclusionary list may specify questions such as "What's up?", "How's it going", "Are you there?" and the like. Closer system 125, while detecting questions using NLP, may not consider such phrases as questions for purposes of providing notifications as described within this disclosure.

Continuing with the example of FIG. 1, user A may not receive an answer to message 155 from user B. In one arrangement, user B may not respond to communication 155 at all. In another arrangement, user B, working through client 140, may send a communication to user A in response to communication 155. The communication, however, may not have an answer for the question posed in communication 155. As discussed, closer system 125 may utilize NLP to determine whether any communication from user B directed to user A in response to communication 155 includes an answer. In the case where user B does respond to communication 155, a user interface presented through client 140 may provide a control that may be selected by user B. Selection of the control indicates that the user, i.e., user B, would like to be notified when an answer to the question posed in communication 155 is determined. In one arrangement, responsive to user B selecting the control, client 140 may send a communication to closer system 125 requesting that user B be placed on a notification list associated with the question posed in message 155. Closer system 125 may add user B to the notification list.

Since the question posed in communication 155 and still unanswered, user A may send a communication including the same question to user C using client 145. As pictured communication 155 is provided to client 145. In one example, client 135 may forward communication 155 to user C of client 145. In another example, user A may create a new message including the same question as communication 155 that may be sent to client 145. It should be appreciated that the question, as provided to user C of client 145, may be sent using the same communication channel or a different communication channel as used to send message 155 to user B and client 140. As defined herein, the term "same question" means that a subsequent question is determined to be exactly the same as a prior question or is considered a variation of the prior question. For example, a question maybe determined to be the same question as the previous question even if phrased in a different way using differing language so long as the two questions have the same or similar meaning.

In another example, user C of client 145 may receive message 155, including the question, as a forward from user B of client 140. Whether user C receives the question from user A of client 135 (the initiator) or from user B (a question recipient), closer system 125 may determine that user C is also a question recipient. A question recipient is a user that receives a communication that is determined to include a question as described herein.

In the example of FIG. 1, user C is unable to provide an answer to the question posed in communication 155. Closer system 125 may determine that User C has not responded to communication 155 or has provided a response that does not provide an answer to the question posed in communication 155. Closer system 125 further may determine whether user C of client 145, as a question recipient, has indicated an interest in knowing an answer, once determined, for the question posed. Responsive to determining that user C would like to be notified of an answer, closer system 125 may add user C to the notification list associated with the question of communication 155.

User A may then provide the question to user D. As pictured, communication 155 is provided to user D and client 150. As described with respect to user C, user A may forward communication 155, generate a new communication with the same question, or the like. In another aspect, user D may receive the question and become a question recipient as a result of user B and/or user C forwarding message 155 or sending the question in a newly created communication to user D of client 150.

In this example, user D provides communication 160 to user A in response to communication 155 and in response to the question. Communication 160 may include an answer to the question posed in communication 155. In one arrangement, closer system 125 may utilize NLP to determine whether communication 160 includes an answer to the question posed in communication 155.

In another arrangement, closer system 125 may be notified by user A of client 135 that communication 160 provides an answer to the question of communication 155. For example, user A may select a control presented through the UI of client 135. Selection of the control may cause client 135 to send a communication to closer system 125 indicating that the communication received by user A from user D, i.e., communication 160, provides an answer to the question posed in communication 155.

Responsive to determining that an answer has been provided question, closer system 125 may determine each question recipient that was unable or did not provide an answer. In this example, closer system 125 may identify user B and user C as users that may be interested in obtaining an answer to the question posed in communication 155. Accordingly, closer system 125 may send communication 165 to user B and user C. Communication 165 may be a notification that an answer has been found. In another example communication 165 may include and/or specify the answer to the question originally asked in message 155.

As illustrated in FIG. 1, closer system 125 may recognize a collaboration that takes place not only among a plurality of different users, but also across a plurality of different communication channels. In one aspect, closer system 125 may recognize a collaboration in which a user asks a question of one or more users by detecting the question asked within the communications.

In another aspect, closer system 125 may recognize the collaboration by performing a time-based analysis of the communications that are sent in combination with performing NLP. For example, in the case of user A seeking an answer to a question, the communications sent from user A to user B, from user A to user C, and from user A to user D may take place within a predetermined amount of time and/or a predetermined amount of time of one another. In cases where a user is seeking an answer, the user may send the communications in fairly rapid succession, e.g., within seconds or minutes of one another. NLP and time-based analysis allows closer system 125 to recognize that the various communications described, which may not be part of a formal conversation thread, are part of a same collaboration.

Still, it should be appreciated that users may be provided with controls that may be accessed through each individual client that allow the user to designate a communication as a question for purposes of notification, as an answer to a previously identified question, and/or request notification when the answer is ascertained.

FIG. 1 is provided for purposes of illustration and is not intended to limit the inventive arrangements described herein. It should be appreciated that network data processing system 100 may include fewer elements than shown or more elements such as additional servers, clients, and other devices.

Figure 2:
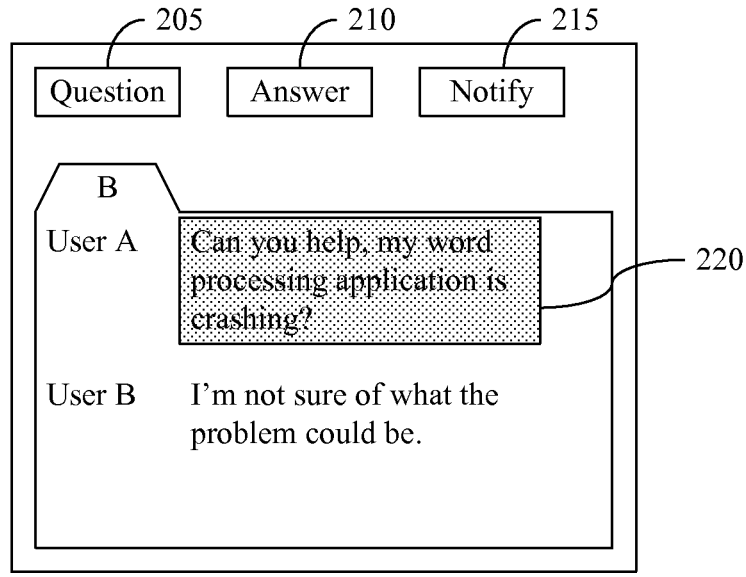
FIG. 2 is an example of a user interface for a client device.

FIG. 2 is an example of a UI 200 for a client. UI 200 may be a graphical user interface that may be presented by client 135 of FIG. 1. For purposes of illustration, user A has asked a question of user B. The question is "Can you help, my word processing application is crashing?" User B has responded indicating that he or she does not know how to correct the problem. In this example, UI 200 may include a plurality of controls including a question control 205, an answer control 210, and a notify control 215. In one exemplary implementation, user A, in asking question 220, may select question 220 as shown. Further, user A may select control 205. Selection of control 205 may cause the client to send a communication to closer system 125 indicating that communication 220 includes a question to be tracked for purposes of notification. In this example, user B does not have an answer to question 220.

Figure 3:
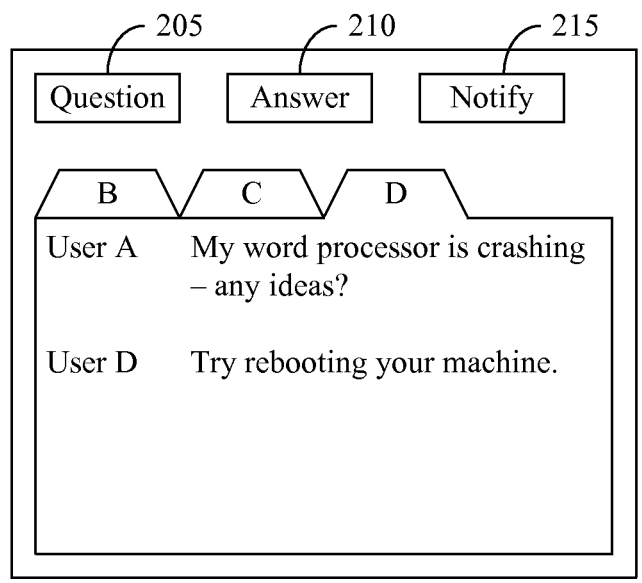
FIG. 3 is another example of the user interface of FIG. 2.

FIG. 3 is another example of user interface 200 for a client. FIG. 3 illustrates the state of UI 200 after user A has contacted user B and user C for an answer to the question in communication 220. As pictured, user A has now contacted user D. The conversations with users B, C, and D are illustrated as tabs within UI 200 labelled as A, B, and D, respectively. In this example, user D has provided an answer to the question posed. In this example, the question is worded differently than in FIG. 2 to illustrate that despite the different wording, closer system 125 has determined that the communications between user A and B, between user A and C, and between user A and D are all part of the same collaboration that includes message 220. In any case, user A may select control 210 indicating that the response received from user D is the answer. In one aspect, user A may select the text of the response from user D and then select control 210.

FIGS. 2 and 3 further illustrate the notify control 215. Control 215 may be selected by question recipients that do not have an answer. For example, users B and C may select control 210 within their UIs of their clients. Responsive to users B and C selecting control 215, each respective client may send a communication to closing system 125 requesting that the users be added to the notification list for the question. In this example, responsive to user A selecting control 210, the client may notify closing system 125 of the answer and, in response thereto, closing system 125 may send a communication to users B and C notifying the users that the question was answered. The communication further may include the answer to the question, e.g., a quote of the response from user D that provided the answer to the question of communication 220.

It should be appreciated that the example UIs of FIGS. 2 and 3 are provided for purposes of illustration only and are not intended as limitations. Various aspects such as the controls described may be included in UIs and client applications of other varieties such as electronic mail client applications and/or social networking client applications. Further, As discussed, closing system 125 may use NLP and/or timing analysis to identify questions, related communications, and answers as part of a collaboration. In the case where NLP is used, UIs may include a control such as control 215 allowing the user to indicate a preference for being notified of the answer.

FIG. 4 is an exemplary data structure illustrating a collaboration 400. The data structure of FIG. 4 may be generated and persisted by closing system 125 of FIG. 1. The data structure of FIG. 4 illustrates a plurality of records for a single collaboration. As defined herein, the term collaboration refers to a plurality of communications that are grouped or related to a particular question asked by an initiating user, i.e., an "initiator." The communications for a collaboration may be obtained from the various messaging systems described with reference to FIG. 1, aggregated into a message history, and analyzed. Records 1, 5, 10, 11, 15, and 16 each are shown as belonging to collaboration 1. Other records may be interspersed with those illustrated in FIG. 4 belonging to other collaborations or just representing communications not part of a collaboration (not relating to a detected question).

In the example of FIG. 4, referring to record 1, closing system 125 has identified a communication from user A, as the initiator, to user B. The communication is an instant message and includes a question. As such, user B may be considered a question recipient. Since the communication identified in record 1 is a question from the initiator, the field indicating whether the user would like to be notified of an answer is moot an may be null. It should be appreciated that the question posed in the communication also may be persisted, but is not illustrated in the example of FIG. 4. Record 5 indicates that an instant message communication as a response from user B to user A has been detected that does not provide an answer. The notification field of record 5 indicates that user B has indicated a preference for being notified of an answer when determined.

Record 10 indicates that an electronic mail communication from user A to user C asking the same question as posed in the communication represented by record 1 has been detected. Record 11 indicates that an electronic mail communication from user C to user A has been detected as a response that does not provide an answer. The notification field of record 11 indicates that user C does not wish to be notified of an answer when determined.

Record 15 indicates that a social networking communication from user A to user D asking the same question as posed in the communications represented by records 1 and 10 has been detected. Record 16 indicates that a social networking communication from user D to user A has been detected that does provide an answer to the question In one aspect, responsive to closing system 125 determining that the communication from user D to user A does provide an answer, closing system 125 may notify user C of the answer. In one aspect, closing system 125 may send a communication, which may include the answer, using a particular or designated (e.g., default) communication channel that is not dependent upon the communication channel over which user B was asked the question or responded to the question. In another aspect, closing system 125 may notify user B of the answer over the same communication channel that user B was asked the question or the same communication channel over which user B responded to the question if different.

FIG. 4 illustrates that closing system 125 may detect collaborations that occur across multiple communication channels. Closing system 125 recognizes the various communications as belonging to the same collaboration by virtue of the question being asked and the sender of the communication. As noted, closing system 125 further may utilize the timing of communications being sent from the same user, e.g., user A in this example, in combination with NLP to identify communications belonging to the same collaboration.

Figure 5:
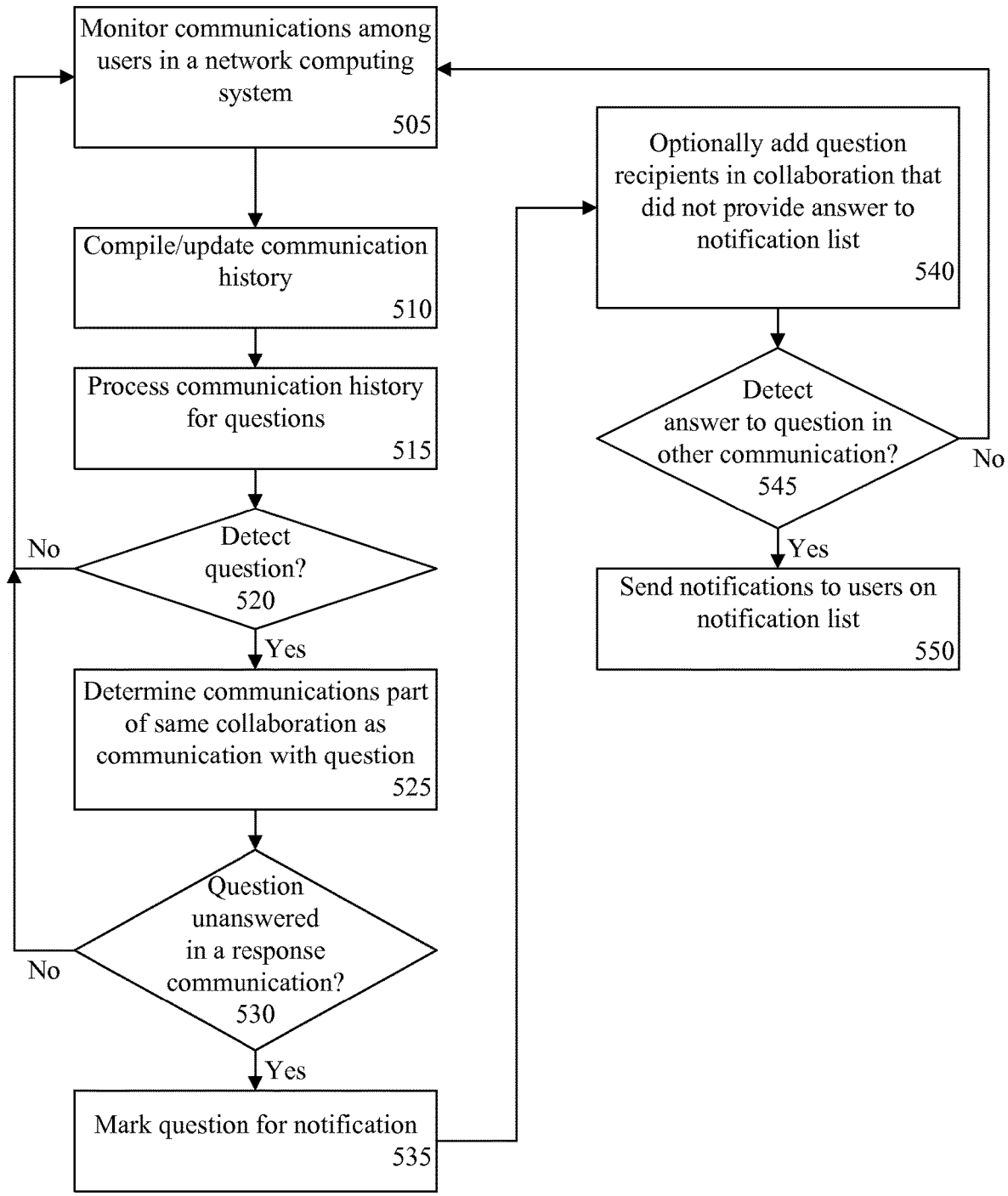
FIG. 5 is a flow chart illustrating an exemplary method of knowledge management and communication distribution in a network computing system.

FIG. 5 is a flow chart illustrating an exemplary method 500 of knowledge management and communication distribution in a network computing system. Method 500 is provided for purposes of illustration and is not intended to limit the inventive arrangements described within this disclosure. Method 500 may be performed or implemented by closer system 125 of FIG. 1 (hereafter "the system").

In block 505, the system may monitor communications among one or more users in a network computing system. In one aspect, the system may query one or more different communication systems for messages, or records of message, exchanged between users of the communication systems. In block 510, the system may compile and/or update a communication history with information received from the communication systems. For example, the system may aggregate communications and/or records of communications exchanged among users from one or more different communication systems into the communication history.

In block 515, the system may process the communication history for questions. The system may process communications exchanged among users to determine whether any of the communications within the compiled communication history include a question. As discussed, the system may determine whether a particular communication includes a question using any of a variety of different processing techniques. In one example, the system may determine whether the communication includes an indicator designating the communication as including a message for notification purposes. The indicator may be added to the communication by a client responsive to a user input designating the communication as including a question. In another example, the system may process communications in the communication history using NLP to determine which communications include a question.

In block 520, the system may determine whether any of the communications include a question. If not, method 500 may loop back to block 505 to continue monitoring communications, compiling and/or updating the communication history, and processing communications for questions. If the system determines that a communication does include a question, method 500 may continue to block 525.

In block 525, the system may determine communications that are part of a same collaboration as the communication determined to include the question (hereafter "the selected communication"). In one example, the system may determine that any response to the selected communication is part of the collaboration. In another example, the system may determine that any other communication sent from the initiator, e.g., the sender of the selected communication, that also includes the question is part of the same collaboration, whether sent through a different communication channel, whether a newly created communication including the message, and/or a forward of the original selected communication. The yet another example, the system may determine that any forward of the selected communication by a question recipient is part of the same collaboration. In a further example, the system may determine that any communication from a question recipient that is a newly generated communication that includes the question, as determined using NLP, is also part of the collaboration. The system may apply time constraints in performing such determinations as previously described. As noted, the system may evaluate communications for inclusion within the same collaboration that may or may not have been sent over the same communication channel as the selected communication.

In block 530, the system may determine whether the question detected within the selected communication is unanswered in one or more response communications. For example, the system may evaluate the communications determined to be part of the same collaboration as the selected communication and determine whether any of the response communications included within the collaboration specify an answer to the question. A response communication is a communication sent from a user that received the question and which is directed to the initiator of the question, i.e., the sender of the selected message.

In block 535, responsive to determining that at least one response communication does not include an answer to the question, the system may mark the question for notification. As discussed, in another arrangement, the sender of the communication, e.g., the initiator, may explicitly mark the question for notification. In block 540, the system may optionally add question recipients that did not provide an answer to a notification list. In one aspect, question recipients may be added to the notification list automatically as described. In another aspect, question recipients may be added to the notification list only responsive to an explicit request to be added.

In block 545, the system may determine whether an answer to the question is detected within a response communication of the collaboration. If not, method 500 may loop back to block 505 and continue processing as described. The communication history may be updated and the collaboration further may be updated and processed to determine whether an answer is provided. If an answer to the question is detected within a response communication in the collaboration, method 500 may continue to block 550.

In block 550, the system may send notifications to users on the notification list. In one aspect, the system may send notifications to users on the notification list automatically responsive to determining that an answer to a question is provided. In another aspect, the system may present the notification list to the initiator via a UI of the client. The initiator may select one or more users from the notification list. The system may send notifications to only those users selected by the initiator from the notification list.

In one arrangement, the system may send notifications to users using a predetermined, or default, communication channel used by the system. For example, the system may be configured to utilize instant messaging, electronic mail, and or a social networking system to provide notifications to users. In another arrangement, the system may send notifications to users over the same communication channel that the user received the question from the initiator and/or over the same communication channel the user used to respond to the question. For example, the system may send an instant message notification to a user from the notification list responsive to determining that the user either received the question from the initiator as an instant message communication or provided a response communication to the initiator as an instant message. For the same collaboration, the system may send an electronic mail notification to another user from the notification list responsive to determining that the user either received a question from the initiator as an electronic mail communication or provided a response communication to the initiator as an electronic mail.

In another arrangement, the system may support a muting operation for recipients of the question. As used herein, muting means suppressing an indicator of a communication, suppressing a communication, and/or removing a user as a recipient from further communications determined to be part of a collaboration. As an illustrative example, a user may be involved in an electronic mail thread started by an initiator asking a question. In one exemplary implementation, the user may provide an input to his or her client requesting muting. In response, the system may remove the user as a recipient of any further electronic mails for the thread. The system may receive the user request and, in response, instruct the electronic mail system to remove the user as a recipient of any other electronic mails determined to be part of the conversation thread.

In another example, the system may communicate to the other communication systems to prevent or suppress communications from being directed to the user. For example, the user may be on an electronic mail conversation thread relating to the question and an instant messaging conversation relating to the question. Responsive to the mute request from the user, the system may suppress further communications relating to the question and directed to the user for both the electronic mail system and the instant messaging system. In one aspect, muting further may include suppressing or stopping notifications for communications determined to be part of the collaboration of the communication including the question.

Figure 6:
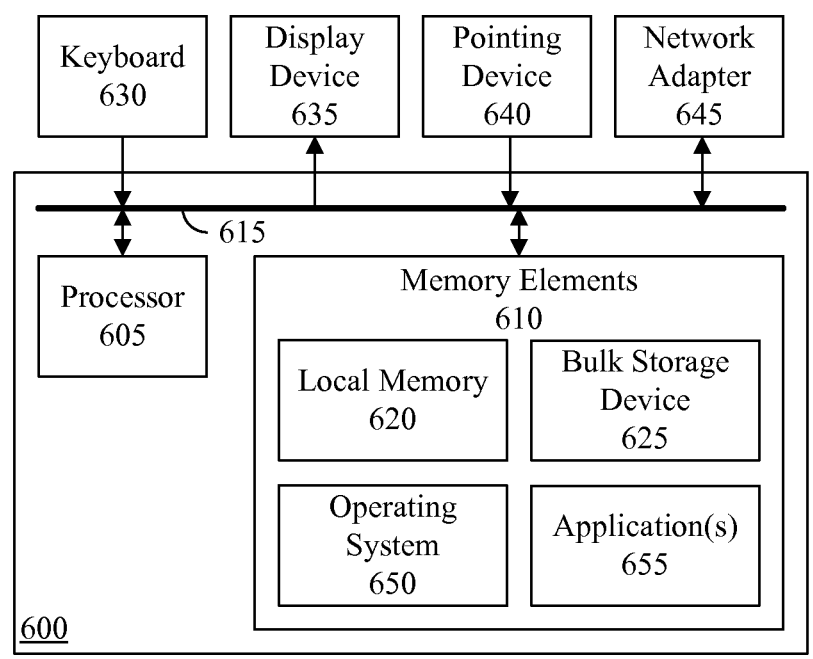
FIG. 6 is a block diagram illustrating an exemplary architecture for data processing system.

FIG. 6 is a block diagram illustrating an exemplary architecture 600 for a data processing system. Architecture 600 may be used to implement a computer that is suitable for storing and/or executing program code. In one aspect, for example, architecture 600 may be used to implement closing system 125 of FIG. 1.

Architecture 600 includes at least one processor 605, e.g., a central processing unit (CPU), coupled to memory elements 610 through a system bus 615 or other suitable circuitry. Architecture 600 stores program code within memory elements 610. Processor 605 executes the program code accessed from memory elements 610 via system bus 615. In one aspect, architecture 600 may be used to implement a computer or other data processing system that is suitable for storing and/or executing program code. It should be appreciated, however, that architecture 600 may be used to implement any system including a processor and memory that is capable of performing the operations described within this disclosure.

Memory elements 610 include one or more physical memory devices such as, for example, a local memory 620 and one or more bulk storage devices 625. Local memory 620 may be implemented as a random access memory (RAM) or other non-persistent memory device(s) generally used during actual execution of the program code. Bulk storage device 625 may be implemented as a hard disk drive (HDD), solid state drive (SSD), or other persistent data storage device. Architecture 600 also may include one or more cache memories (not shown) that provide temporary storage of at least some program code in order to reduce the number of times program code must be retrieved from the bulk storage device during execution.

Input/output (I/O) devices such as a keyboard 630, a display device 635, and a pointing device 640 optionally may be coupled to architecture 600. The I/O devices may be coupled to architecture 600 either directly or through intervening I/O controllers. A network adapter 645 may also be coupled to architecture 600 to enable a system implemented using architecture 600 to become coupled to other systems, computer systems, remote printers, remote storage devices, and/or the like through intervening private or public networks. Modems, cable modems, Ethernet cards, and wireless transceivers are examples of different types of network adapter 645 that may be used with architecture 600.

Memory elements 610 store an operating system 650 and an application 655. Operating system and application 655, being implemented in the form of executable program code, are executed by architecture 600. As such, operating system 650 and/or application 655 may be considered an integrated part of any system implemented using architecture 600. Application 655 and any data items used, generated, and/or operated upon by architecture 600 while executing application 655 are functional data structures that impart functionality when employed as part of architecture 600.

In the case where architecture 600 is used to implement closing system 125 of FIG. 1, operating system 650 may be a server-side operating system; and, application 655 may be a server-side application that, when executed, causes the system to perform the various operations described herein.

In accordance with the inventive arrangements disclosed herein methods, systems, and apparatus are provided that facilitate knowledge management and the distribution of communications. The inventive arrangements allow knowledge, in the form of answers to questions asked of users through communication systems, to be distributed to those users having an interest in the answer. Communication distribution is not provided openly across all users, but rather provided only to those users that were directly asked a question by an initiating user. Moreover, the system distributes the actual answer to the question to those users that are interested as opposed to providing status updates on a topic which may or may not provide any information as to a particular solution to a question or problem.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method by a computer hardware system connected to a network of computing systems and client devices, comprising:

simultaneously monitoring, in real time by a closer system, a plurality of electronic communication channels for electronic communications exchanged between the client devices;

detecting, via the monitoring and by the closer system performing natural language processing on a first electronic communication from a client device of a first user directed to a client device of a second user, a question within the first electronic communication;

recording, in a computer data structure associated with the question, that the question is unanswered by the second user upon a determination that the question is unanswered;

detecting, via the monitoring and by the closer system performing natural language processing on a second electronic communication from a client device of a third user directed to the first user, an answer to the question within the second electronic communication; and sending to the client device of the second user, based upon the answer and using the computer data structure, an electronic notification of the answer to the question, wherein the first, second, and third client devices are connected to the network.

2. The method of claim 1, wherein
the determination that the question is unanswered is based upon a detection of an electronic communication after the first electronic communication, from the first user to the client device of the third user, that includes the question.

3. The method of claim 2, wherein
the electronic communication after the first electronic communication, from the first user to the client device of the third user, is determined to be within a predetermined amount of time from the first electronic communication.

4. The method of claim 1, wherein
the first electronic communication occurs in a first communication channel, and
the second electronic communication occurs in a second and different communication channel.

5. The method of claim 1, wherein
the second user is notified automatically responsive to the answer being detected in the second electronic communication.

6. The method of claim 5, wherein
the automatic notification is based upon a field in the computer data structure in which the second user has indicated preference of being notified of the answer.

7. The method of claim 1, further comprising:
generating a list of users to which electronic communications comprising the question are sent and for which an answer is not received;
presenting the list to the first user responsive to the answer being detected; and
sending the electronic notification, to each user on the list selected by the first user, notifying each selected user of the answer.

8. A computer hardware system connected to a network of computing systems, comprising:
a hardware processor programmed to initiate the following operations:
simultaneously monitoring, in real time by a closer system, a plurality of electronic communication channels for electronic communications exchanged between the client devices;
detecting, via the monitoring and by the closer system performing natural language processing on a first electronic communication from a client device of a first user directed to a client device of a second user, a question within the first electronic communication;
recording, in a computer data structure associated with the question, that the question is unanswered by the second user upon a determination that the question is unanswered;
detecting, via the monitoring and by the closer system performing natural language processing on a second electronic communication from a client device of a third user directed to the first user, an answer to the question within the second electronic communication; and
sending to the client device of the second user, based upon the answer and using the computer data structure, an electronic notification of the answer to the question, wherein
the first, second, and third client devices are connected to the network.

9. The system of claim 8, wherein
the determination that the question is unanswered is based upon a detection of an electronic communication after the first electronic communication, from the first user to the client device of the third user, that includes the question.

10. The system of claim 9, wherein
the electronic communication after the first electronic communication, from the first user to the client device of the third user, is determined to be within a predetermined amount of time from the first electronic communication.

11. The system of claim 8, wherein
the first electronic communication occurs in a first communication channel, and
the second electronic communication occurs in a second and different communication channel.

12. The system of claim 8, wherein
the second user is notified automatically responsive to the answer being detected in the second electronic communication.

13. The system of claim 12, wherein
the automatic notification is based upon a field in the data structure in which the second user has indicated preference of being notified of the answer.

14. The system of claim 8, wherein the hardware processor is further programmed to initiate the following operations:
generating a list of users to which electronic communications comprising the question are sent and for which an answer is not received;
presenting the list to the first user responsive to the answer being detected; and
sending the electronic notification, to each user on the list selected by the first user, notifying each selected user of the answer.

15. A computer program product, comprising
a computer readable storage medium having program code stored thereon,
the program code executable by a computer hardware system connected to a network of computing systems to perform:
simultaneously monitoring, in real time by a closer system, a plurality of electronic communication channels for electronic communications exchanged between the client devices;
detecting, via the monitoring and by the closer system performing natural language processing on a first electronic communication from a client device of a first user directed to a client device of a second user, a question within the first electronic communication;
recording, in a computer data structure associated with the question, that the question is unanswered by the second user upon a determination that the question is unanswered;
detecting, via the monitoring and by the closer system performing natural language processing on a second electronic communication from a client device of a third user directed to the first user, an answer to the question within the second electronic communication; and
sending to the client device of the second user, based upon the answer and using the computer data structure, an electronic notification of the answer to the question, wherein
the first, second, and third client devices are connected to the network.

16. The computer program product of claim 15, wherein
the determination that the question is unanswered is based upon a detection of an electronic communication after the first electronic communication, from the first user to the client device of the third user, that includes the question.

17. The computer program product of claim 16, wherein
the electronic communication after the first electronic communication, from the first user to the client device of the third user, is determined to be within a predetermined amount of time from the first electronic communication.

18. The computer program product of claim 15, wherein
the first electronic communication occurs in a first communication channel, and
the second electronic communication occurs in a second and different communication channel.

19. The computer program product of claim 15, wherein
the second user is notified automatically responsive to the answer being detected in the second electronic communication.

20. The computer program product of claim 19, wherein
the automatic notification is based upon a field in the computer data structure in which the second user has indicated preference of being notified of the answer.

* * * * *